United States Patent
Zhao et al.

(10) Patent No.: US 10,472,977 B2
(45) Date of Patent: Nov. 12, 2019

(54) EROSION STRIP INTEGRATED WITH CARBON ALLOTROPE-BASED DEICING/ANTI-ICING ELEMENTS

(71) Applicant: Goodrich Corporation, Charlotte, NC (US)

(72) Inventors: Wenping Zhao, Glastonbury, CT (US); Galdemir Cezar Botura, Akron, OH (US); Tommy M. Wilson, Jr., Cuyahoga Falls, OH (US); Brad Hartzler, Doylestown, OH (US); Zaffir A. Chaudhry, S. Glastonbury, CT (US)

(73) Assignee: Goodrich Corporation, Charlotte, NC (US)

( * ) Notice: Subject to any disclaimer, the term of this patent is extended or adjusted under 35 U.S.C. 154(b) by 337 days.

(21) Appl. No.: 15/394,179

(22) Filed: Dec. 29, 2016

(65) Prior Publication Data
US 2018/0187561 A1 Jul. 5, 2018

(51) Int. Cl.
| | |
|---|---|
| F01D 5/28 | (2006.01) |
| B64C 3/28 | (2006.01) |
| B64C 11/20 | (2006.01) |
| B64D 15/12 | (2006.01) |
| B23P 6/00 | (2006.01) |
| F02C 7/047 | (2006.01) |
| H05B 3/14 | (2006.01) |

(52) U.S. Cl.
CPC ............. *F01D 5/286* (2013.01); *B23P 6/002* (2013.01); *B64C 3/28* (2013.01); *B64C 11/205* (2013.01); *B64D 15/12* (2013.01); *F02C 7/047* (2013.01); *H05B 3/145* (2013.01); *H05B 2214/02* (2013.01); *H05B 2214/04* (2013.01)

(58) Field of Classification Search
CPC ..... F01D 5/286; H05B 3/145; H05B 2214/04; F02C 7/047; B23P 6/002; B64C 3/28; B64C 11/205; B64D 15/12
See application file for complete search history.

(56) References Cited

U.S. PATENT DOCUMENTS

| | | | |
|---|---|---|---|
| 8,931,740 B2 | 1/2015 | Nordin et al. | |
| 2007/0045477 A1* | 3/2007 | Armstrong | B64C 9/22 244/214 |
| 2008/0099617 A1* | 5/2008 | Gilmore | B64D 15/14 244/134 R |
| 2010/0314586 A1* | 12/2010 | Hong | C08K 9/08 252/511 |

(Continued)

FOREIGN PATENT DOCUMENTS

| | | |
|---|---|---|
| EP | 2724855 A1 | 4/2014 |
| WO | WO2016/144683 A1 | 9/2016 |

OTHER PUBLICATIONS

Extended European Search Report for EP Application No. 17208539.1, dated Feb. 19, 2018, 12 pages.

(Continued)

*Primary Examiner* — Jacob M Amick
*Assistant Examiner* — Charles Brauch
(74) *Attorney, Agent, or Firm* — Kinney & Lange, P.A.

(57) ABSTRACT

An erosion shield assembly includes an erosion shield, a carbon allotrope heater attached to an inner surface of the erosion shield, and an adhesive layer between the carbon allotrope heater and the erosion shield. The carbon allotrope heater includes at least one layer of a carbon allotrope material.

16 Claims, 3 Drawing Sheets

(56) References Cited

U.S. PATENT DOCUMENTS

| | | | |
|---|---|---|---|
| 2011/0290784 A1* | 12/2011 | Orawetz | B64D 15/12 |
| | | | 219/486 |
| 2013/0043342 A1* | 2/2013 | Nordin | B64C 3/20 |
| | | | 244/1 A |
| 2014/0034414 A1 | 2/2014 | Burkett et al. | |
| 2014/0034633 A1 | 2/2014 | Heintz et al. | |
| 2014/0070054 A1 | 3/2014 | Burton et al. | |
| 2014/0127017 A1 | 5/2014 | Virtanen et al. | |
| 2014/0300361 A1* | 10/2014 | Albsmeier | G01R 33/34092 |
| | | | 324/322 |
| 2015/0234513 A1* | 8/2015 | Jiang | G06F 3/0412 |
| | | | 345/174 |
| 2016/0221680 A1 | 8/2016 | Burton et al. | |

OTHER PUBLICATIONS

Communication Pursuant to Article 94(3) EPC from EP Application No. 17208539.1, dated Apr. 15, 2019, 6 pages.

* cited by examiner

EROSION STRIP INTEGRATED WITH CARBON ALLOTROPE-BASED DEICING/ ANTI-ICING ELEMENTS

BACKGROUND

Certain aircraft surfaces—helicopter rotor blades, aircraft engine fan blades, and other aircraft leading edges—are often subject to foreign object damage (FOD) from materials such as sand, rain, and other debris. Hence, these surfaces are often equipped with an erosion shield made from a hardened material. An aircraft moving through clouds is also subjected to ice formation, and anti-icing or de-icing devices must be used to remove or prevent ice from accumulating on exterior surfaces of the aircraft. A metallic heater is typically located behind the erosion strip to provide ice protection. However, separate erosion shield-heater units require a two-step process for assembly or repair.

Carbon nanotubes (CNTs) are allotropes of carbon having a generally cylindrical nanostructure, and have a variety of uses in nanotechnology, electronics, optics and other materials sciences. CNTs are both thermally and electrically conductive. Due to these properties, CNTs can be used as heaters to prevent icing on aircraft or other vehicles. Carbon allotrope heaters are uniquely beneficial for de-icing because of their high efficiency, light weight and ability to be molded into specific shapes, and durability.

SUMMARY

An erosion shield assembly includes an erosion shield, a carbon allotrope heater attached to an inner surface of the erosion shield, and an adhesive layer between the carbon allotrope heater and the erosion shield. The carbon allotrope heater includes at least one layer of a carbon allotrope material.

A method of making an erosion shield assembly includes configuring an erosion shield to form to an aircraft leading edge, and bonding a carbon allotrope heater to an inner surface of the erosion shield using an adhesive layer. The carbon allotrope heater includes at least one layer of a carbon allotrope material.

DETAILED DESCRIPTION

The disclosed erosion shield assembly includes a carbon nanotube (CNT) or other carbon allotrope-based heater. The CNT heater is highly conformable and is therefore easily bonded to the inner surface of the erosion shield, which must take on the exact curvature of the underlying aircraft surface. The combined assembly is a line replaceable unit (LRU), and is more quickly installed and repaired than separate units. Further, the integration of the CNT heater within the erosion shield allows for increased heating efficiency of the aircraft surface and provides protection for the heater itself.

Figure 1:
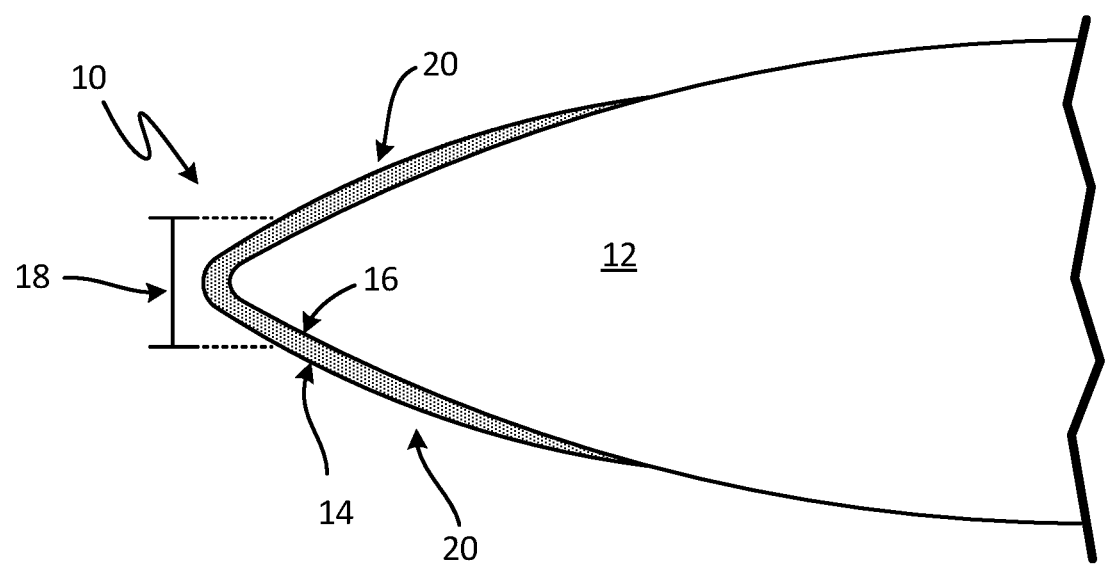
FIG. 1 is a cross-sectional view of an erosion shield assembly.

FIG. 1 is a cross-sectional view of erosion shield assembly 10 formed to an aircraft leading edge 12. Erosion shield assembly 10 includes a breeze side 14 and bond side 16. Breeze side 14 faces an external environment subject to FOD and icing. Bond side 16 is attached to leading edge 12. Erosion shield assembly further includes a first region 18 surrounding the tip of leading edge 12, and a second region 20 extending away from the tip of leading edge 12. Leading edge 12 can include the leading edge of a helicopter rotor blade, engine fan blade, aircraft wing, or any aircraft leading edge that may be exposed to either FOD or icing.

Figure 2:
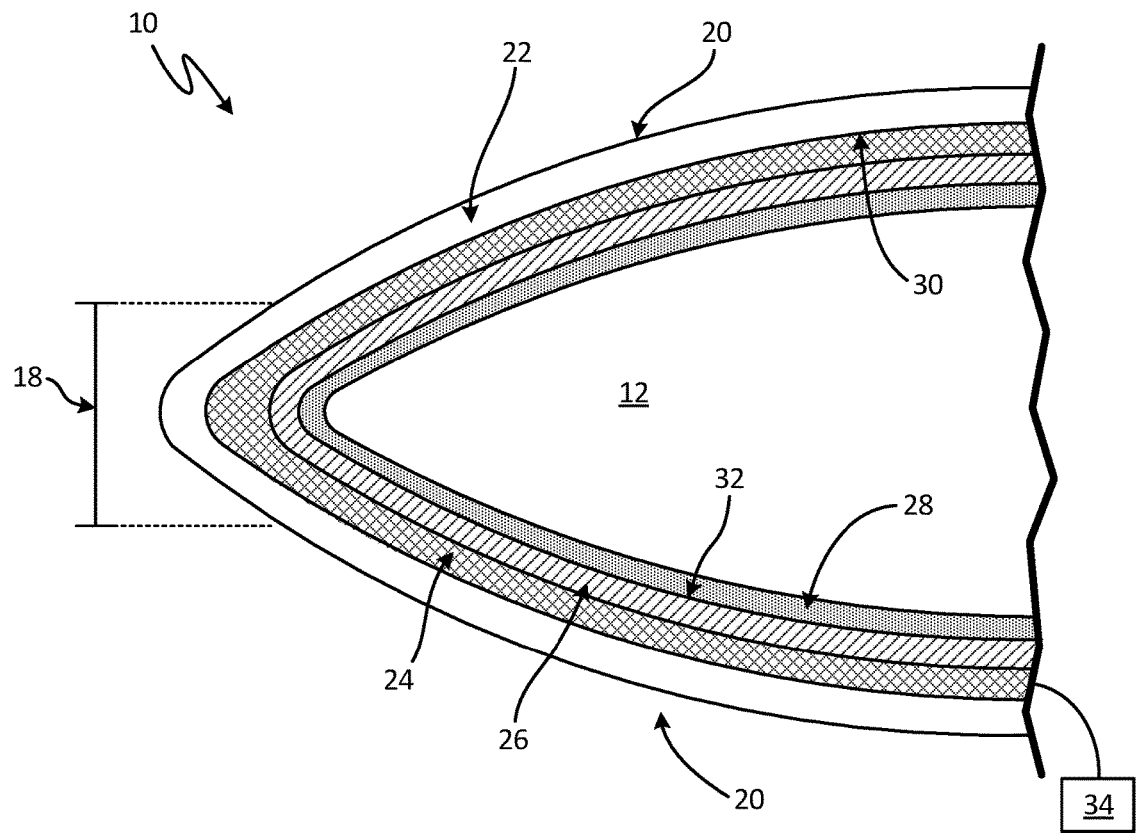
FIG. 2 is a cross-sectional view of an enlarged section of the erosion shield assembly.

FIG. 2 is an enlarged view of erosion shield assembly 10. Erosion shield assembly 10 includes erosion shield 22, adhesive layer 24, carbon allotrope heater 26, and pre-preg layer 28. Erosion shield 22 includes inner surface 30. Carbon allotrope heater 26 is bonded to inner surface 30 of erosion shield 22 by adhesive layer 24. Pre-preg layer 28 can be bonded to an inner surface 32 of carbon allotrope heater 26, and can be attached to leading edge 12.

Erosion shield 22 can be a metallic, alloy-based, conformable coating, or rubber-type material designed to protect leading edge 12 from FOD. Adhesive layer 24 can be any commercially available or other film adhesive. Pre-preg layer 28 is a fabric that is impregnated with a polymer resin, such as an epoxy, a phenolic polymer, or a bismaleimide polymer.

Carbon allotrope heater 26 includes at least one layer containing a carbon allotrope material, such as carbon nanotubes (CNTs), which have a generally cylindrical structure. The CNT layer can be formed from CNTs suspended in a matrix, a dry CNT fiber, or a CNT yarn material, to name a few non-limiting examples. In other embodiments, the carbon allotrope material of carbon allotrope heater 26 includes graphene, graphene nanoribbons (GNRs), or other suitable carbon allotropes. Graphene has a two-dimensional honeycomb lattice structure, and GNRs are strips of graphene with ultra-thin widths.

In some embodiments, carbon allotrope heater 26 includes a plurality of layers of a carbon allotrope material. The plurality of carbon allotrope layers can be arranged in groups to create a plurality of heated zones (not shown) within the erosion shield assembly 10.

Carbon allotrope heater 26 is connected to a power source 34 by wires (not shown). Power source 34 provides direct current (DC) or alternating current (AC) depending on the type and size of the aircraft. The electrical resistivity of the material used in carbon allotrope heater 26 can be modified so that it is compatible with the existing power source on a given aircraft. In some embodiments, the electrical resistivity of carbon allotrope heater 26 ranges from about 0.03 Ω/sq to about 3.0 Ω/sq based on the type of aircraft and the location and size of the aircraft leading edge. The varied resistivity of carbon allotropes is discussed in the following co-pending applications, all of which are hereby incorporated by reference: U.S. patent application Ser. No. 15/368,271, "Method to Create Carbon Nanotube Heaters with Varying Resistance"; U.S. patent application Ser. No. 15/373,370, "Pressurized Reduction of CNT Resistivity"; U.S. patent application Ser. No. 15/373,363, "Adjusting CNT Resistance using Perforated CNT Sheets"; and U.S. patent application Ser. No. 15/373,371, "Reducing CNT Resistivity by Aligning CNT Particles in Films."

Carbon allotrope heater 26 can be configured to have a uniform electrical resistance, such that it has either high or low resistance. In the embodiment of FIG. 2, for example, carbon allotrope heater 26 has a uniform resistance in both the first region 18 and the second region 20 of erosion shield assembly 10.

Figure 3:
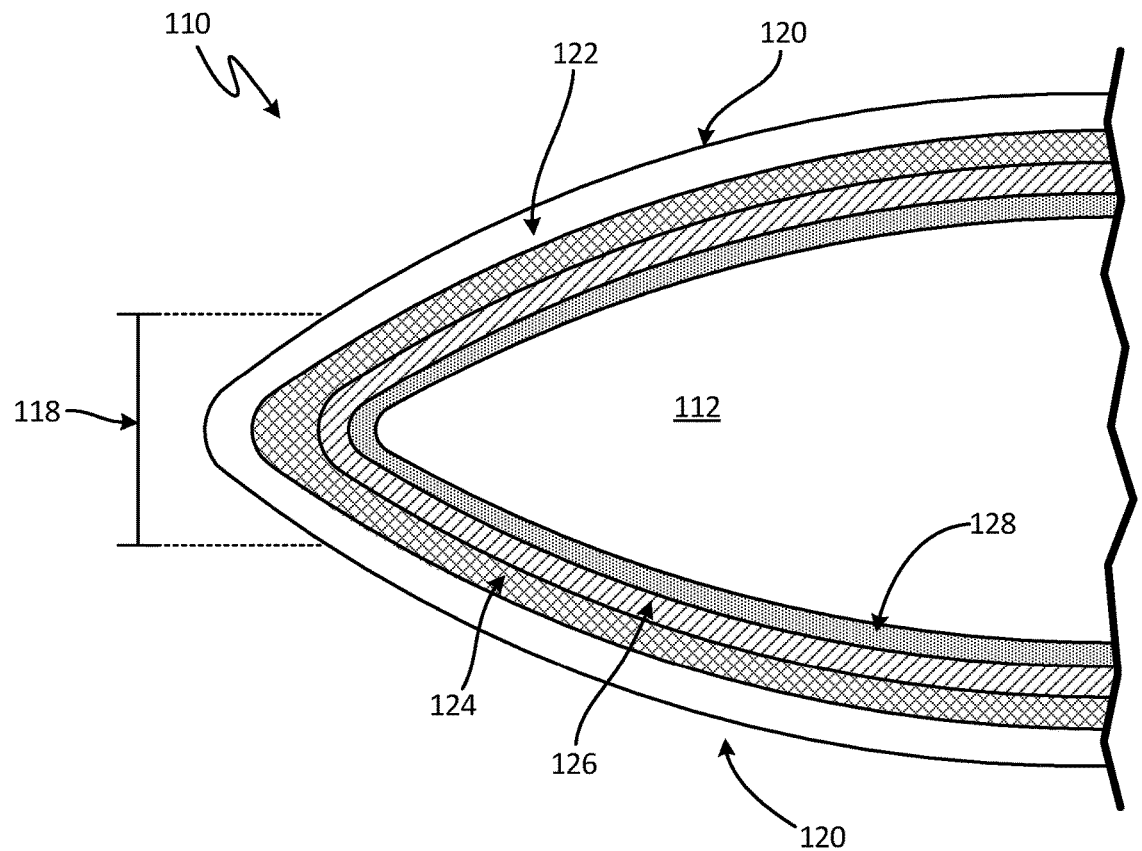
FIG. 3 is a cross-sectional view of an alternative embodiment of the erosion shield assembly.

FIG. 3 is an enlarged view of an alternative embodiment of erosion shield assembly 110 in which carbon allotrope heater 126 is configured to have a variable resistance. In the embodiment shown, carbon allotrope heater 126 has a different resistance in the first region 118 than it does in the second region 120 of erosion shield assembly 110. A higher resistance can be achieved if the electrical components of first region 118 are connected as a circuit in series, while a lower resistance can be achieved if the electrical components are connected as a circuit in parallel. The resistance of first region 118 can be made to be either higher or lower than that of second region 120 because in some conditions, the portion of carbon allotrope heater 126 surrounding the tip of leading edge 112 requires more power to provide adequate ice protection.

A method of making erosion shield assembly 10 includes configuring the erosion shield to form to leading edge 12 of an aircraft. Carbon allotrope heater 26 is bonded to inner surface 30 of erosion shield 22 using adhesive layer 24. Pre-preg layer 28 can be attached to inner surface 32 of carbon allotrope heater 26. The assembled components (erosion shield 22, adhesive layer 24, carbon allotrope heater 26, and pre-preg layer 28) are then cured using, for example, an autoclave or out-of-autoclave (00A) manufacturing process. Erosion shield assembly 10 is then able to be attached to leading edge 12 of an aircraft. In another embodiment, carbon allotrope heater 26 and pre-preg layer 28 are bonded together and subsequently formed to inner surface 30 of erosion shield 22 using a process such as thermoforming.

Erosion shield assembly 10 has several benefits. First, the integral nature of the assembly allows for a single-step installation or removal process, reducing the "down time" of an aircraft. If the assembly is in need of repair or replacement, the components—the erosion shield and the carbon allotrope heater—can be repaired or replaced simultaneously or separately. Further, carbon allotropes are easily conformed to fit any shape or curvature of the erosion shield.

Another benefit of the erosion shield assembly is that carbon allotrope heaters are lightweight and have a lighter thermal mass, making them very efficient at converting energy to heat. The carbon allotrope heater may be carbon nanotubes, graphene and graphene nanoribbons, which are all sufficiently lighter than metals or alloys used in traditional heaters. Carbon allotrope heaters can also be configured to have varied resistance and resistivity based on the aircraft size, available power, and the location of the leading edge on the aircraft.

Discussion of Possible Embodiments

The following are non-exclusive descriptions of possible embodiments of the present invention.

An erosion shield assembly includes an erosion shield, a carbon allotrope heater attached to an inner surface of the erosion shield, and an adhesive layer between the carbon allotrope heater and the erosion shield. The carbon allotrope heater includes at least one layer of a carbon allotrope material.

The erosion shield assembly of the preceding paragraph can optionally include, additionally and/or alternatively, any one or more of the following features, configurations and/or additional components:

The assembly includes a pre-preg layer configured to attach to an inner surface of the carbon allotrope layer.

The carbon allotrope heater includes a plurality of carbon allotrope layers.

The carbon allotrope material is a carbon nanotube material.

The carbon nanotube material includes carbon nanotubes suspended in a matrix.

The carbon nanotube material includes a dry carbon nanotube fiber.

The carbon nanotube material includes a carbon nanotube yarn.

The carbon allotrope heater is connected to a power source.

The carbon allotrope heater has an electrical resistivity ranging from about 0.03 $\Omega$/sq to about 3.0 $\Omega$/sq.

The carbon allotrope heater has a uniform resistance.

The carbon allotrope heater has a variable resistance.

The erosion shield is formed from a material selected from the group consisting of titanium, stainless steel, nickel, rubber, neoprene, and combinations thereof.

A method of making an erosion shield assembly includes configuring an erosion shield to form to an aircraft leading edge, and bonding a carbon allotrope heater to an inner surface of the erosion shield using an adhesive layer. The carbon allotrope heater includes at least one layer of a carbon allotrope material.

The method of the preceding paragraph can optionally include, additionally and/or alternatively, any one or more of the following features, configurations and/or additional components:

The method includes bonding a pre-preg layer to an inner surface of the carbon allotrope heater.

The method includes curing the erosion shield assembly.

The method includes forming the carbon allotrope heater from a plurality of carbon allotrope layers.

The method includes forming the carbon allotrope material from carbon nanotubes.

The method includes connecting the carbon allotrope heater to a power source.

The method includes configuring the carbon allotrope heater to have a uniform resistance.

The method includes configuring the carbon allotrope heater to have a variable resistance. The method includes forming the erosion shield from a material selected from the group consisting of titanium, stainless steel, nickel, rubber, neoprene, and combinations thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An erosion shield assembly comprising:
    an erosion shield configured to form to a leading edge of an aircraft surface;
    a carbon allotrope heater attached to an inner surface of the erosion shield, the carbon allotrope heater comprising:
        at least one layer of a carbon allotrope material;
        a first region having a first electrical resistance; and
        a second region abutting the first region and having a second electrical resistance lower than the first electrical resistance; and
    an adhesive layer between the carbon allotrope heater and the erosion shield;

wherein electrical components of the first region of the carbon allotrope heater are arranged as a circuit in series to provide the first electrical resistance; and wherein electrical components of the second region of the carbon allotrope heater are arranged as a circuit in parallel to provide the second electrical resistance.

2. The assembly of claim 1 and further comprising: a pre-preg layer configured to attach to an inner surface of the carbon allotrope layer.

3. The assembly of claim 1, wherein the carbon allotrope heater comprises a plurality of carbon allotrope layers.

4. The assembly of claim 1, wherein the carbon allotrope material is a carbon nanotube material.

5. The assembly of claim 4, wherein the carbon nanotube material comprises carbon nanotubes suspended in a matrix.

6. The assembly of claim 4, wherein the carbon nanotube material comprises a dry carbon nanotube fiber.

7. The assembly of claim 4, wherein the carbon nanotube material comprises a carbon nanotube yarn.

8. The assembly of claim 1, wherein at least one of the first and second regions of the carbon allotrope heater has an electrical resistivity ranging from about 0.03 Ω/sq to about 3.0 Ω/sq.

9. The assembly of claim 1, wherein the erosion shield is formed from a material selected from the group consisting of titanium, stainless steel, nickel, rubber, neoprene, and combinations thereof.

10. A method of making an erosion shield assembly comprising:
    configuring an erosion shield to form to an aircraft leading edge;
    bonding a carbon allotrope heater to an inner surface of the erosion shield, the carbon allotrope heater comprising:
        at least one layer of a carbon allotrope material;
        a first region; and
        a second region abutting the first region;
    configuring electrical components of the first region as a circuit in series to provide the first region a first electrical resistance; and
    configuring electrical components of the second region as a circuit in parallel to provide the second region a second electrical resistance lower than the first electrical resistance;
    wherein the carbon allotrope heater is bonded to the inner surface of the erosion shield using an adhesive layer.

11. The method of claim 10 and further comprising: bonding a pre-preg layer to an inner surface of the carbon allotrope heater.

12. The method of claim 10 and further comprising: curing the erosion shield assembly.

13. The method of claim 10 and further comprising: forming the carbon allotrope heater from a plurality of carbon allotrope layers.

14. The method of claim 10 and further comprising: forming the carbon allotrope material from carbon nanotubes.

15. The method of claim 10 and further comprising: connecting the carbon allotrope heater to a power source.

16. The method of claim 10 and further comprising: forming the erosion shield from a material selected from the group consisting of titanium, stainless steel, nickel, rubber, neoprene, and combinations thereof.

* * * * *